United States Patent [19]

Sick et al.

[11] 4,157,752

[45] Jun. 12, 1979

[54] IMPRESSION SURFACE CONVEYOR BELTING AND METHOD OF MANUFACTURE

[75] Inventors: Paul J. Sick, Buffalo; James W. Hazel, Youngstown, both of N.Y.

[73] Assignee: Albany International Corp., Albany, N.Y.

[21] Appl. No.: 894,027

[22] Filed: Apr. 6, 1978

[51] Int. Cl.$^2$ .................. B65G 15/34; B29G 5/00; B32B 5/12; B32B 3/00

[52] U.S. Cl. .................. 198/847; 74/231 R; 156/148; 264/136; 264/137; 428/113; 428/156; 428/172; 428/235

[58] Field of Search .......... 428/113, 156, 172, 235; 264/136, 137; 156/148; 74/231 P, 231 R, 232; 198/845, 846, 847

[56] References Cited

U.S. PATENT DOCUMENTS

| | | | |
|---|---|---|---|
| 2,992,150 | 7/1961 | Goy | 74/232 |
| 3,177,904 | 4/1965 | Siverson | 198/846 |
| 3,197,021 | 7/1965 | Williams | 74/232 |
| 3,545,293 | 12/1970 | Marzocchi et al. | 74/231 R |
| 3,616,164 | 10/1971 | Tanimoto et al. | 428/235 |
| 3,664,909 | 5/1972 | Ackley | 264/137 |
| 4,095,606 | 6/1978 | Frandsen | 74/231 P |

*Primary Examiner*—William R. Dixon, Jr.
*Attorney, Agent, or Firm*—Kane, Dalsimer, Kane, Sullivan and Kurucz

[57] ABSTRACT

The disclosure is of impression surface conveyor belting and a method for its manufacture. The belting comprises a plurality of substantially parallel textile yarns of a specific character, integrated (in a unitary structure) with a layer of consolidated staple fibers and encapsulated in a matrix of flexible elastomer or resin. Included in the integral structure is an impression wear surface of partially isolated matrix material containing a portion of the consolidated staple fibers (a fiber bundle) which are continuously anchored in a portion of the non-isolated belting matrix. The belting of the invention is useful to manufacture non-laminated, impression surface, conveyor belts which exhibit advantageous properties of wear resistance, stability in running and structural integrity.

24 Claims, 4 Drawing Figures

```
┌─────────────────────────────────────┐
│ PROVIDE NEEDLED FABRIC SUPPORT      │
└─────────────────────────────────────┘
                 │
                 ▼
┌─────────────────────────────────────┐
│ ENVELOPE FABRIC IN ELASTOMERIC MATRIX│
└─────────────────────────────────────┘
                 │
                 ▼
┌─────────────────────────────────────┐
│ FORM SURFACE PATTERN                │
└─────────────────────────────────────┘
```

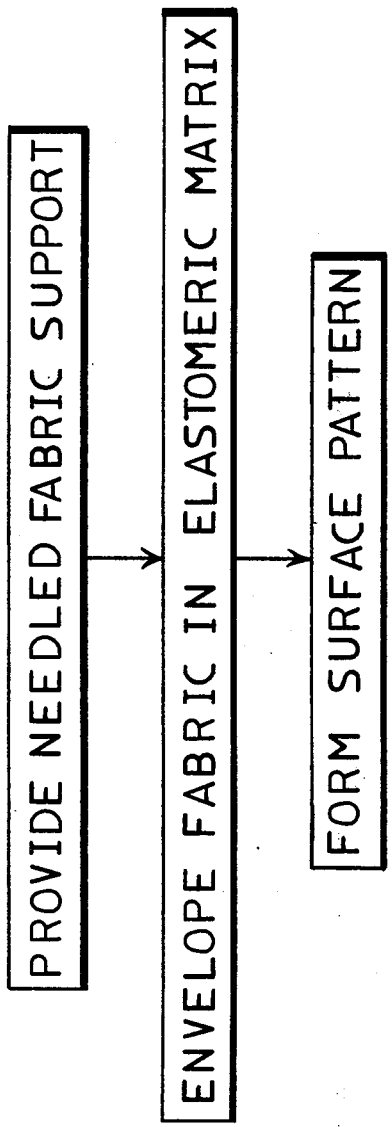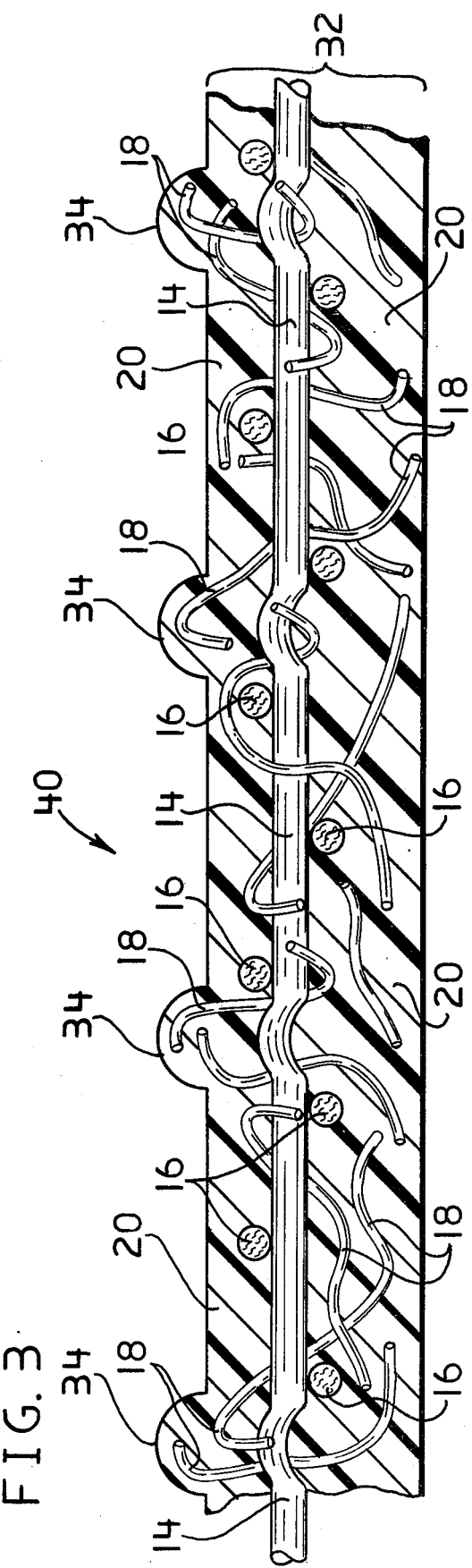
FIG. 4
FIG. 3

IMPRESSION SURFACE CONVEYOR BELTING AND METHOD OF MANUFACTURE

BACKGROUND OF THE INVENTION

1. Field of the Invention

The invention relates to non-laminated, impression surface conveyor belting and to methods of its manufacture.

2. Brief Description of the Prior Art

A review of the prior art is contained in Man Made Textile Encyclopedia, pages 309–312. In general, textile based conveyor belting is made by the so-called "wet-woven PVC" method wherein polyester warp yarns are immersed in polyvinyl chloride compound and then woven together while wet. Alternatively, belting may be made by lamination of textile cloths with elastomeric sheets. The resultant belting is not entirely satisfactory for all purposes. For example, the laminated belts are subject to delamination and structural failure over periods of use. Further, the prior art method of producing an impression surface belting comprised sewing or weaving a fibrous bundle or fabric "button" or like protuberance onto the surface of the belting fabric and surface coating the resultant fabric with an elastomer. The "button," a fibrous bundle, was particularly subject to abrasive action and readily abraded away from the base belting or flattened. A great deal of hand labor was also required, making the prior art method laborious and costly.

The method and belting of our invention represent improvements in the art. The method of manufacture is economical, efficient and produces an advantageous non-laminated product. The belting of the invention is useful in the manufacture of impression surfaced conveyor belts which exhibit advantageous properties of resistance to abrasion (particularly on the edges) and fraying, flexibility, and structural and running stability. The non-laminated belting of the invention obviates the prior art problem of delamination. Impression surface belting is useful in conveyor applications for the sorting and separation of articles, particularly sheet materials such as tobacco leaves and the like.

SUMMARY OF THE INVENTION

The invention comprises a non-laminated, impression surface, conveyor belting, which comprises;
 a plurality of substantially parallel textile yarns characterized by their high tensile strength, low stretch and uniformity of shrink;
 a layer of fibrous material in the form of discrete staple fibers, said layer being consolidated through entanglement of the individual fibers and integrated with said yarns by entanglement of the fibers therewith, said entanglements being of the character produced by a needling operation; and
 a matrix of a synthetic, non-cellular, flexible polymer substantially encapsulating the layer, individual fibers thereof and the integrated yarns;
 said layer and said matrix together having one planar surface which is discontinuous with selected raised portions of fiber encapsulated impression members.

The invention also comprises a method of manufacturing a non-laminated impression surface belting; which comprises;
 providing a plurality of substantially parallel textile yarns characterized by their high tensile strength, low stretch and uniformity of shrink;
 needling to said yarns a bat of discrete staple fibers;
 heat setting the needled material; impregnating the heat set material with a synthetic, non-cellular, solid, flexible polymer forming liquid;
 molding the impregnated material so as to obtain one planar surface thereof with discontinuous, raised portions of matrix encapsulating fibers of said layer; and curing the liquid to cross-link the polymer.

The invention also comprises non-laminate, impression surface conveyor belts made from the belting of the invention and the use of the belting in conveyor belt applications.

BRIEF DESCRIPTION OF THE DRAWINGS

FIG. 3 is a cross-sectional, side elevation of an embodiment belting of the invention.

FIG. 4 is a block diagram outlining the method of the invention.

DETAILED DESCRIPTION OF THE PREFERRED EMBODIMENTS OF THE INVENTION

Figure 1:
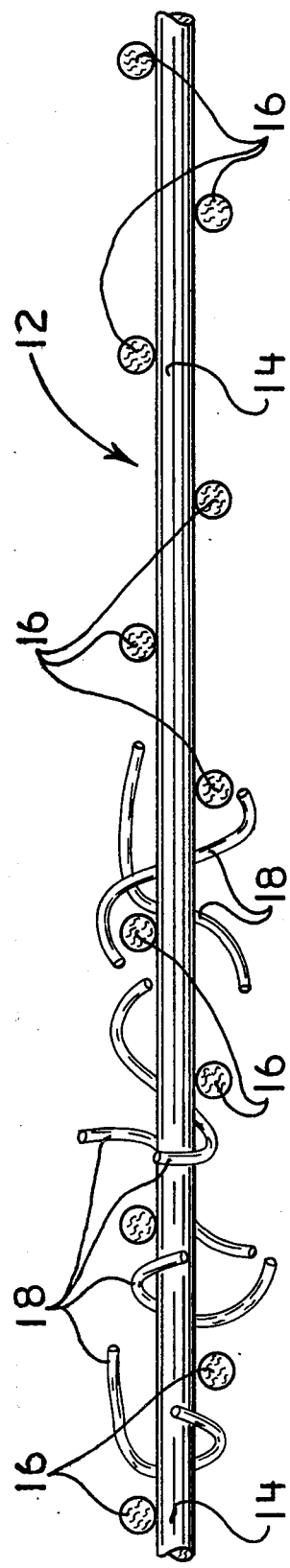
FIG. 1 is a cross-sectional, side elevation of a portion of an embodiment fabric component employed in the manufacture of the belting of the invention.

The method of the invention comprises (1) providing a needled fabric support, (2) enveloping the fabric within a polymer matrix and (3) forming an impression surface pattern on one surface of the matrix as diagrammed in FIG. 4, a process flow chart setting forth the method of the invention.

In carrying out the method of the invention, the needled fabric supporting the textile yarns may be provided incorporated in a cloth. For example, the textile yarns provided may be in the form of lengthwise yarns in a woven cloth or its equivalent in a knitted cloth. This is not essential however, and the yarns may be provided in a substantially parallel warp array, wherein the yarns are independent of each other. The term "substantially parallel" as used herein means that the yarns, for the most part, do not cross over each indiscriminately. The provided textile yarns require a relatively high tensile strength, i.e.,; on the order of at least about 20 lbs./end.

Advantageously, the provided textile yarn will have low stretch properties, for example on the order of at least about 4 to 5 percent ($\frac{1}{4}$ nominal breaking load) to about 15 to 20 percent.

It is important that the yarns exhibit uniformity in their shrink characteristics, i.e., yarns of a high degree of shrinkability should not be mixed with yarns of a low degree of shrinkability to minimize buckling or cockling of the belting.

The provided yarns may be selected from a wide variety of synthetic yarns, such as polyester, polyamide and like yarns. Preferably the yarns will be spun yarns or the like having a tendency to absorb and hold solid polymer forming liquids.

In one embodiment of the invention, the textile yarns are provided in an open weave scrim as lengthwise yarns. Any weave may be used, a plain weave being stable and advantageous. In this embodiment, the nature of the crosswise yarns is not critical and any conventional synthetic or natural fiber yarn can be used. Advantageously the denier of the yarns and the density of the weave is selected to provide a scrim weight of from about 4 to about 40 oz./square yard for optimum strength.

In the next step of the method of the invention, discrete staple fibers such as presented in a non-woven fibrous bat, are needled to the above-described textile yarns. The bats may be of randomly oriented staple fibers such as synthetic polyamide, polester, polyolefin, acrylic and like fibers including blends thereof and natural fibers such as jute and blends thereof. Optionally if desired the fibers may be directionally oriented within the bats by methods known to the art.

The bats of staple fibers selected for needling to the textile yarns advantageously have a weight of from about 2 to about 20 oz./square yard. The staple fibers may have a wide denier range. The bats may be preneedled using conventional techniques to obtain some integrity of the fibers prior to needling the bat to the yarns.

In needling the fibrous bats to the yarns, there is formed a layer of consolidated staple fibers, which through entanglement with the yarns becomes integrated therewith. If fibrous bats are needled to only one side of the yarns, fibers are carried to the opposite side to produce a light "nap" or fuzz or loose fiber ends on that side, incorporating the yarns. In another embodiment of the invention, fibrous bats are needled to both sides of the textile yarn, to produce a thicker needled fabric.

The techniques of needling fibrous bats to yarns and cloths woven or knitted from textile yarns are well known and details need not be recited here. The coarseness of the felting needles used, the barb configurations, number, size and other variables are dependent somewhat on the degree of openness between the textile yarns, so as to avoid rupture of the textile yarns. In general, we have found a No. 28 gauge needle, with the barbs oriented so as not to tear the lengthwise yarns, adequate for needling. The needling frame may be fitted with either high or low density needle boards, a 34 density board being illustrative. Needling is preferably carried out to produce a needled fabric having a weight within the range of from about 6 to about 90 oz./square yard.

Following needling, it is advantageous to calender those needled materials wherein further consolidation is desired, particularly in those embodiments where a bat was needled to one side of the yarns only. The calendering further compacts and consolidates the staple fibers to reduce fluid permeability of the needled fabric. This enhances the retention of the liquid polymer compound received by the needled material in the impregnation step. Generally, it is desirable to have a fabric for impregnation, characterized by its ability to accept and retain the polymer liquid precursor until solidification occurs. If the needled fabric lacks this characteristic, calendering may be advantageous. Calendering is not generally necessary if fibrous bats have been needled to both sides of the textile yarns.

In the next step of the method of the invention, the needled and possibly calendered fabric is heat set in an oven to selectively shrink the fabric. During heat setting, the fabric may be tensioned in the lengthwise direction (along the axis of the textile yarns) under from 0.5 to 20 lbs. per inch or more of fabric width. This eliminates a large degree of stretching in the final product, and obviates wrinkles across the width and along the length of the belt product of the invention. Heat setting is carried out under temperatures dependent on the nature of the fibers and yarns employed in the needled fabric. Those skilled in the art will know which temperatures to select. For example, when all polyester components are employed, heat setting may be carried out at temperatures within the range of from about 300° F. to 420° F.

The heat set, needled material is then impregnated with a non-cellular, liquid polymer compound. This may be carried out by dipping the fabric material into the liquid. It will be appreciated that a single dipping may suffice for impregnating some materials, while multiple dippings with intermittent squeezing or partial drying steps may be required to fully impregnate dense fibrous layers in other needled fabrics. Saturation of the fabric is advantageous.

A wide range of liquid saturants may be employed, selected from elastomers or synthetic resin precursors. Representative are the liquid precursors for polyurethane, polyvinyl chloride, neoprene, styrene-butadiene and like noncellular sythetic polymer resins or elastomers. A particularly preferred class of liquid impregnant are the liquid carboxylated acrylonitrile/butadiene copolymer latexes. The acrylonitrile/butadiene copolymer elastomers formed from them are highly flexible, crack-resistant even at low temperatures and form strong bonds with the textile components of the fabrics of the invention. Liquid impregnants without carriers and/or solvents may be used. However, the latex employing a water carrier is advantageous. Liquid impregnants employing organic solvents and carriers can also be employed as those skilled in the art will appreciate.

Desirably, the impregnation of the heat set and needled fabric will provide high loading of solid polymer, substantially penetrating the textile fabric so as to emcapsulate the consolidated layer, individual fibers and yarns. Advantageously voids in the textile fabric are filled with polymer so that polymer is distributed throughout the body of the final product. Advantageously the impregnation is such that the belting of the invention will comprise cured polymer matrix constituting from 50 to 500 percent, preferably 100 to 350 percent of the textile fabric component weight.

The next step in the method of the invention for preparing belt fabrics of the invention is to mold the impregnated material so as to form at least one planar surface with discontinuities or raised portions, i.e.; an impression surface. The raised discontinuities comprise matrix material encapsulating ends of the fibrous layer, anchored to the textile yarns. Once molded, the impregnant is cured. Curing may be affected by any means appropriate for the polymer matrix to be formed. For example, by heat for heat curable resins. Advantageously, in that case, the saturated material is passed through a heated platen press or like apparatus with an impression molding surface, at a temperature sufficient to cure the resin. This provides for molding and curing the impregnated material. Advantageously, the impregnated material is simultaneously pressed to produce a belting. Pressures of from about 25 to about 200 lbs./square inch are practical and illustrative of pressures which may be employed. Preferably the impregnated fabric is pressed and cured under pressures of from about 90 to 130 lbs./square inch.

Referring now to FIG. 1, a cross-sectional side elevation of a portion of an embodiment fabric component 12 may be seen which is useful in the manufacture of the belting of the invention. The fabric 12 comprises a plurality of lengthwise yarns 14 (one shown) in a simple weave with corsswise yarns 16. The yarns 14, 16 by needling and after heat setting form a fibrous layer (for simplicity of illustration only a few fibers 18 are shown in FIG. 1).

Figure 2:
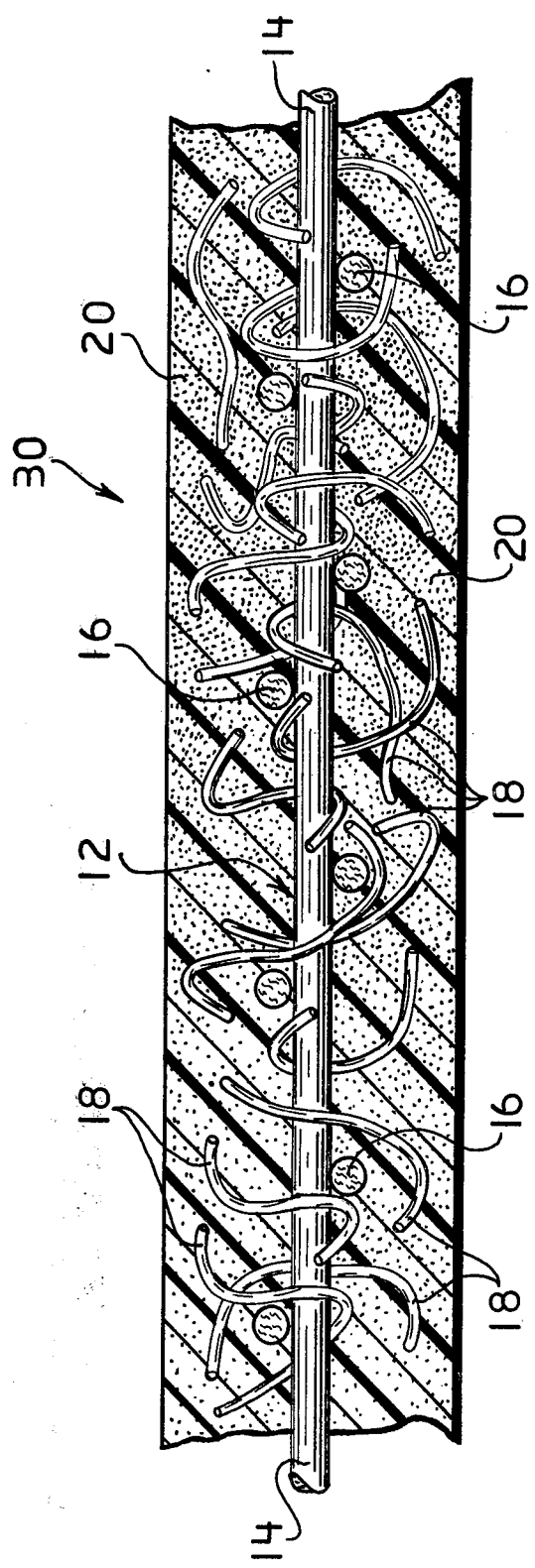
FIG. 2 is a cross-sectional, side elevation of the fabric shown in FIG. 1, encapsulated in a matrix layer according to the method of the invention.

FIG. 2 is a cross-sectional, side elevation of the fabric 12, encapsulated in a matrix layer of curable, solid polymer forming saturant 20 to form a belting precursor 30. This structure 30 is obtained by saturating the fabric 12 with a liquid polymer compound saturant 20.

Referring now to FIG. 3, one may see an enlarged cross-sectional side elevation of an embodiment belting 40 of the invention, prepared by the above-described method of the invention. The belting 40 consists of the woven scrim fabric 12 described above. Lengthwise yarns 14 and crosswise yarns 16 may be, for example spun polyester yarns. Integrated with scrim 12 in a distinct layer are a plurality of staple fibers 18 such as polyester fibers needled to the scrim 12 and consolidated thereby. In making the belting 40, bats of staple fibers were needled to upper and lower surfaces of scrim 12. This forms a dense, fibrous layer (for illustrative purposes, only a few fibers 18 have been shown in FIGS. 2 and 3) entangled with scrim 12. The scrim 12 and entangled fibers 18 are completely encapsulated in a matrix of a cured polymeric 20. The belting 40 is free of voids and there is a high degree of bonding between polymer 20 and the fibers 18 and yarns 14, 16. The cured, final belting 40 is produced from the uncured material 30 as shown in FIG. 2 by passing the material 30 through a heated platen press. Under heat and pressure the material 30 is compacted and the impregnant cured to a solid state as shown by cured belting 40 in FIG. 3. By using a patterned surface platen, the belting 40 is molded during curing so as to have one planar surface with raised discontinuities 34.

The raised discontinuities 34 may be of any geometric configuration such as semi-hemispheres, bars, etc. raised off the lower portion 32 of the belting 40. The discontinuous surface formed by raised portions 34 is an impression surface. The raised discontinuities 34 are integral with and a unitary part of the lower portion 32. The fibers 18 extend into the discontinuities 34 from the lower portion 32 and are ultimately anchored to fabric 12 as previously described. The discontinuities 34 are therefore intimately bound to the rest of the structure 40 and are highly resistant to separation therefrom by abrasion or other forces.

The following example describes the manner and process of making and using the invention and sets forth the best mode contemplated by the inventors of carrying out the invention, but are not to be construed as limiting.

EXAMPLE

A fabric is woven with a plain weave using 5000 denier Multiplex Dacron polyester (DuPont Type 97; average elongation 8.4 percent [¼ nominal breaking load] break strength 59 lbs; dry heat shrinkage at 160° C. is 9.0 percent) in the lengthwise direction and 1150 denier spun polyester yarn in the crosswise direction. The cloth is composed of 17 ends per inch and 10 picks per inch and weighs 14 oz/square yard. The cloth is combined with two needled bats of 100 percent polyester fibers (non-woven), each weighing 6 oz./square yard, in two passes through a needle loom. In the first pass, one bat is applied to one side to the fabric; and in the second pass, a bat is applied to the opposite side of the fabric. The fabric is then heat set under moderate lengthwise tension by running at 9 feet per minute through a 90 foot long oven with a temperature of 320° F. in the initial zone, 350° F. in an intermediate zone, and 390° F. in the final zone. The heat set fabric is then saturated by dipping in a nitrile latex compound of the following composition:

|  | Parts by Weight Wet |
|---|---|
| 68-151 Latex* | 91.4 |
| Aqua Ammonia, 28% | 0.9 |
| 50% Butyl Zimate Slurry** | 0.2 |
| 68% Sulfur Dispersion | 0.3 |
| 60% Zinc Oxide Dispersion | 2.1 |
| Black Pigment | 4.2 |
| Coagulant WS*** | 0.9 |
|  | 100.0 |

*A carboxylated acrylonitrile/butadiene copolymer latex; Tylac 68-151, Reichhold Chemicals, Inc., Bulletin TB-1
**Zinc di-n-butyl dithiocarbamate.
***A polyether-polysiloxane, Mobay Chemical Co.

The saturated fabric is then dried by exposure to infra red lamps for 20 minutes and then dipped again in the same formulation latex compound and again dried by infra red lamps to a moisture content of approximately 5%.

The impregnated fabric is then heated in a 300° F. flat, embossing platen hydraulic press for about 4 minutes and then pressed at 300° F. for 3 minutes at 120 psi to obtain a flexible embossed, impression belting product with the following physical properties:

| Thickness | 0.135" base and 0.190" including raised portion |
|---|---|
| Weight | 103.5 oz./square yard |
| Ultimate Tensile Strength | 1100 lbs./inch of width |
| Elongation | 2.5% at 100 lbs./inch load |

The product fabric is calculated to contain 73 oz./square yard of elastomer added in the saturation step. The molded surface is in the pattern of a series of parallel dots or hemispheres. The belting is made up in an endless conveyor belt and used to convey tobacco leaves in a sorting operation. After one season of use, the belting exhibits minimal signs of degradation under the conditions of use and continues to function in a superior manner.

Those skilled in the art will appreciate that many modifications may be made to the above-described preferred embodiments without departing from the spirit and the scope of the invention. For example, the belting of the invention may be coated with other materials to enhance their usefulness in selected areas. For example, the belting of the invention may be coated with polyurethane, polyvinyl chloride, polytetrafluoroethylene, silicone rubber, and like polymer coatings. Also the preferred embodiment belting 40 has been described as having for an impression surface a design or pattern of dots. The impression surface may be in the form of bars, broken bars, circles, wedges or any other designed geometric form.

As a further example of a modification in the process of the invention, the impression surface conveyor belting of the invention may be molded continuously as well as in batch procedure. In a continuous operation, the polymer forming impregnated fabric is passed through a ROTO-CURE unit and hot pressed between a heated impression roller and a travelling steel belt. Under heat and pressure in the ROTO-CURE the impression surface is molded and the saturant cured as a continuous sheet of the impregnated fabric travels continuously through the apparatus.

What is claimed:

1. A unitary mono-layer, impression surface conveyor belting, which comprises:
   a plurality of substantially parallel textile yarns characterized by their high tensile strength, low stretch and uniformity of shrink;
   a layer of fibrous material in the form of discrete staple fibers, said layer being consolidated through entanglement of the individual fibers and integrated with said yarns by entanglement of the fibers therewith, said entanglements being of the character produced by a needling operation; and
   a matrix of a synthetic, non-cellular polymer substantially encapsulating the layer, individual fibers thereof and the integrated yarns;
   said layer and said matrix together having an impression wear surface of raised matrix material containing a portion of the consolidated staple fibers in a bundle and which are continuously anchored in a portion of the non-isolated matrix material.

2. The belting of claim 1 wherein said yarns are incorporated as yarns in a cloth.

3. The belting of claim 2 wherein said yarns are the lengthwise yarns of a knitted cloth.

4. The belting of claim 2 wherein said yarn are lengthwise yarns in a woven cloth.

5. The belting of claim 4 wherein said layer is produced by needling a bat of staple fibers to one side of said cloth.

6. The belting of claim 4 wherein said layer is produced by needling a bat of staple fibers to each side of said cloth.

7. The belting of claim 1 wherein said yarns are polyester.

8. The belting of claim 7 wherein said fibers are polyester.

9. The belting of claim 1 wherein said polymer is an acrylonitrile-butadiene copolymer.

10. The belting of claim 1 wherein the polymer compound comprises from 50 to 500 percent by weight of the yarns and fibers.

11. A conveyor belt manufactured from the belting of claim 1.

12. A method of manufacturing a non-laminated, impression surface conveyor belting, which comprises;
    providing a plurality of substantially parallel textile yarns characterized by their high tensile strength, low stretch and uniformity of shrink; needling to said yarns a bat of discrete staple fibers;
    heat setting the needled material;
    impregnating the heat set material with a synthetic, non-cellular, flexible solid polymer forming liquid;
    molding the impregnated material so as to obtain one planar surface thereof with discontinuous, raised portions of matrix encapsulating fibers of said layer; and
    curing the liquid to cross-link the polymer.

13. The method of claim 12 wherein a bat of fibers is needled to each side of the yarns.

14. The method of claim 13 wherein the yarns are in a woven cloth.

15. The method of claim 12 wherein needling is on one side of the yarns and the needled fabric is then calendered to further consolidate the needled fabric.

16. The method of claim 12 wherein the yarns are held under tension while the needled material is heat set.

17. The method of claim 12 wherein impregnating is carried out by dipping the heat set material in said liquid.

18. The method of claim 12 wherein said liquid is a aqueous latex and after impregnation, the material is dried to remove a portion of the water.

19. The method of claim 12 wherein said liquid is a mixture of said resin and a liquid carrier and the liquid is evaporated from the material before curing.

20. The method of claim 12 wherein the impregnated material is dried and then cured.

21. The method of claim 12 wherein curing is effected by passing the impregnated material through a heated platen press.

22. The method of claim 12 wherein said molding is by impressing the surface of the impregnated material with an impressing platen.

23. The method of claim 22 wherein molding and curing are carried out simultaneously by passing the saturated material through a heated impressing platen.

24. The method of claim 23 wherein said passing is carried out continuously on a continuous length of impregnated material.

* * * * *